April 20, 1954     M. C. BERGEY     2,675,786
POWER MECHANISM FOR ADJUSTING THE FLIGHT
CONTROL SURFACES OF AIRCRAFT
Filed Sept. 28, 1948     5 Sheets-Sheet 1
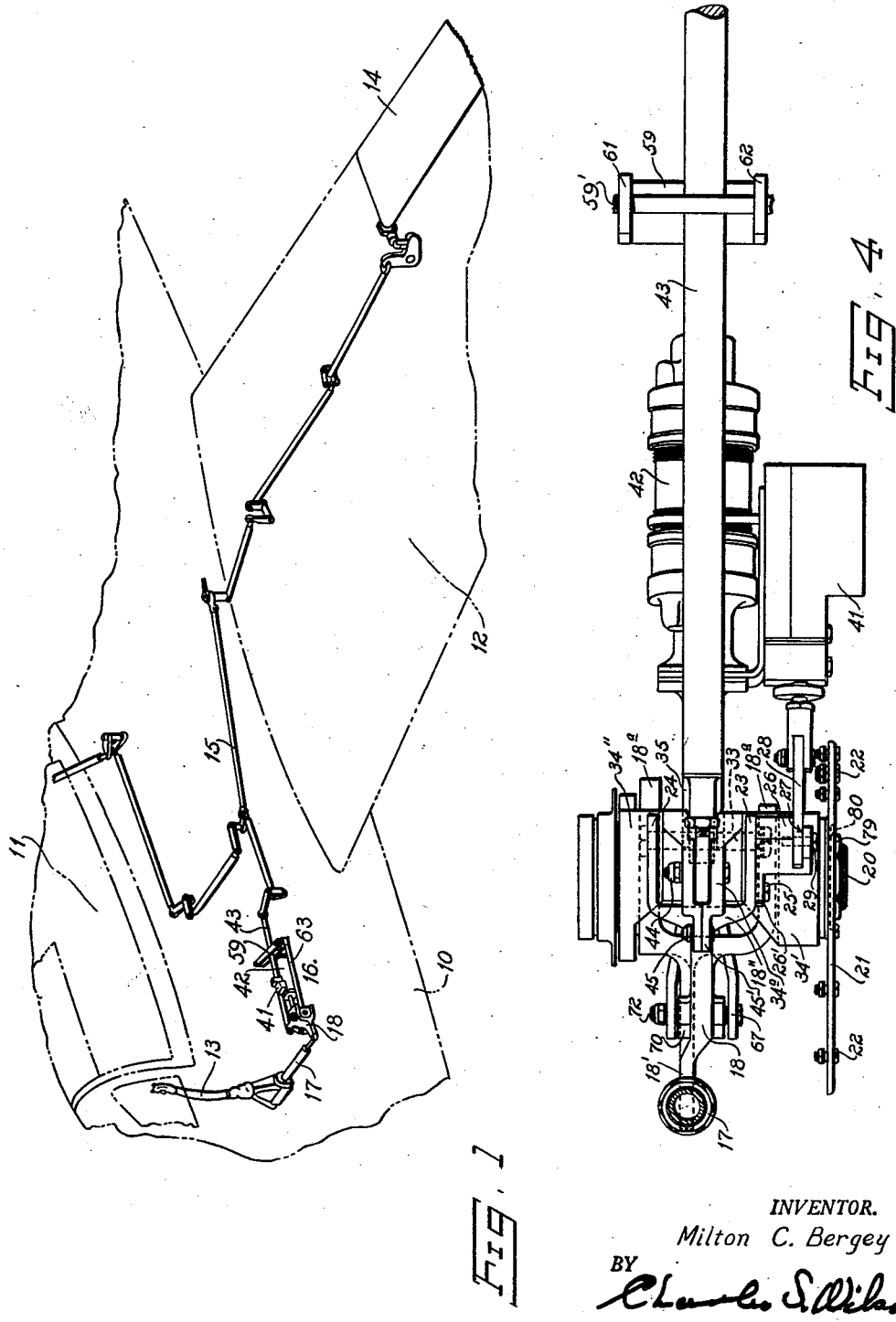
INVENTOR.
Milton C. Bergey
BY
ATTORNEY.

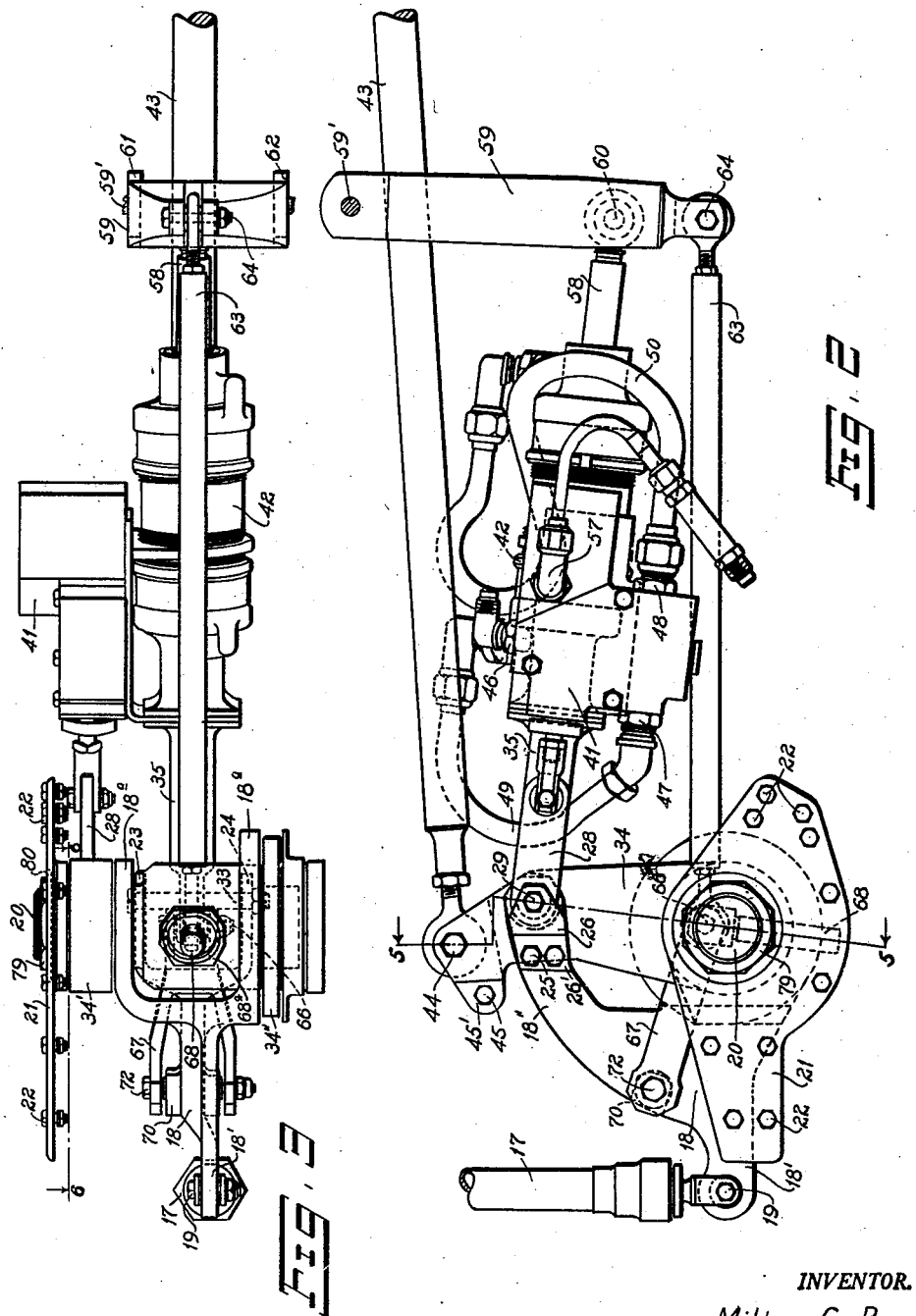

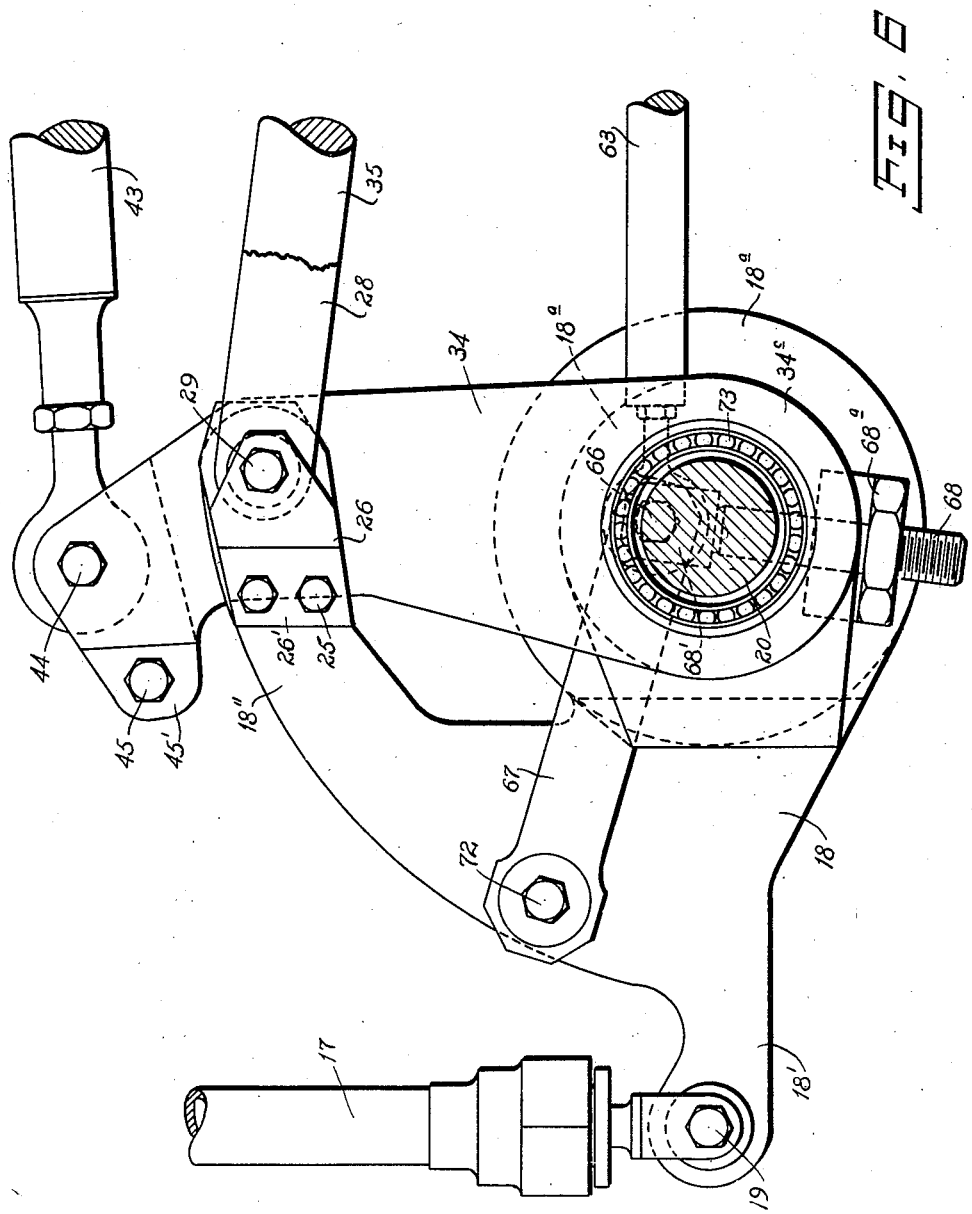

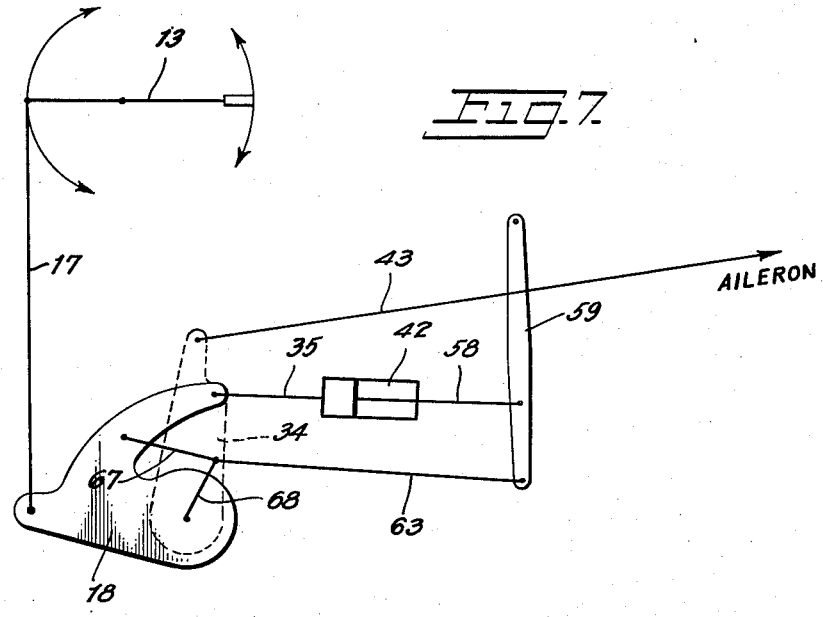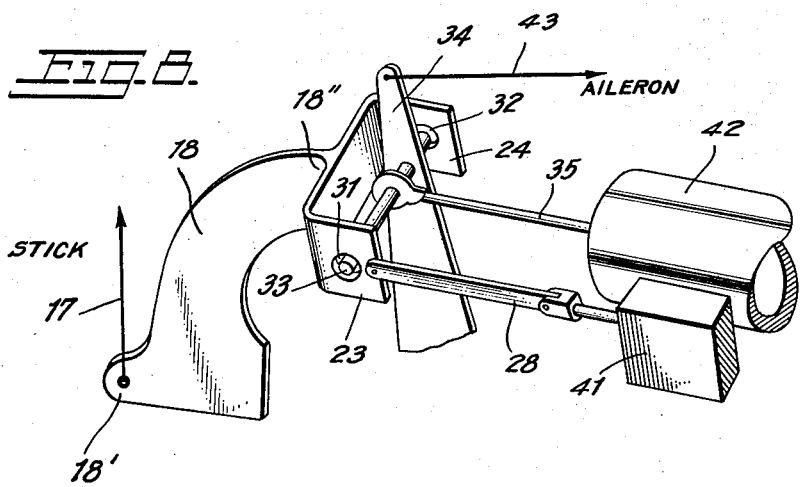

Patented Apr. 20, 1954

2,675,786

UNITED STATES PATENT OFFICE 2,675,786

POWER MECHANISM FOR ADJUSTING THE FLIGHT CONTROL SURFACES OF AIRCRAFT

Milton C. Bergey, Huntington, N. Y., assignor to Republic Aviation Corporation, Farmingdale, N. Y., a corporation of Delaware Application September 28, 1948, Serial No. 51,548

4 Claims. (Cl. 121—41)

This invention relates to control systems for aircraft and proposes a power means incorporated in said system for the operation of the control surfaces against their resistance to movement due to or developed by aerodynamic pressures or forces, said power means to be under the control of, and regulated and adjusted by and through, a conventional control lever or equivalent device.

Moreover the present invention while embodying power means in the system for adjusting the movable control surfaces, at the same time provides a reversible system by which the pilot is constantly aware of the loads on the control surfaces and/or of the force necessary to angularly displace or adjust them.

With a control system following the teachings of this invention, a pilot will have available all the force or power necessary to adjust or displace the movable control surfaces and at the same time will receive the sensation or reaction on the lever or stick of having actually adjusted or displaced said surfaces against their resistance to movement solely by and from the control lever. Thus the present invention, while actually employing power means for the adjustment of the control surfaces, simulates all of the operational characteristics of the unassisted manual adjustment of the control surfaces by the pilot.

With the above and other objects in view, as will be apparent, this invention consists in the construction, combination and arrangement of parts all as hereinafter more fully described, claimed and illustrated in the accompanying drawings, wherein:

Fig. 1 is a perspective, schematic view showing the present invention in conjunction with a conventional aileron control system, the aircraft components being fragmentarily shown in phantom and part of a movable control surface being shown in full lines;

Fig. 2 is a plan elevation of the present power mechanism in one type of installation, illustrating only those elements of the control system which are directly associated therewith;

Fig. 3 is an elevation of the present power mechanism taken at right angles to Fig. 2 and therefore may be said to be a side view thereof;

Fig. 4 is an elevation of the present mechanism in opposition to Fig. 3;

Fig. 6 is an enlarged sectional view taken along line 6—6 of Fig. 3.

Figure 5:
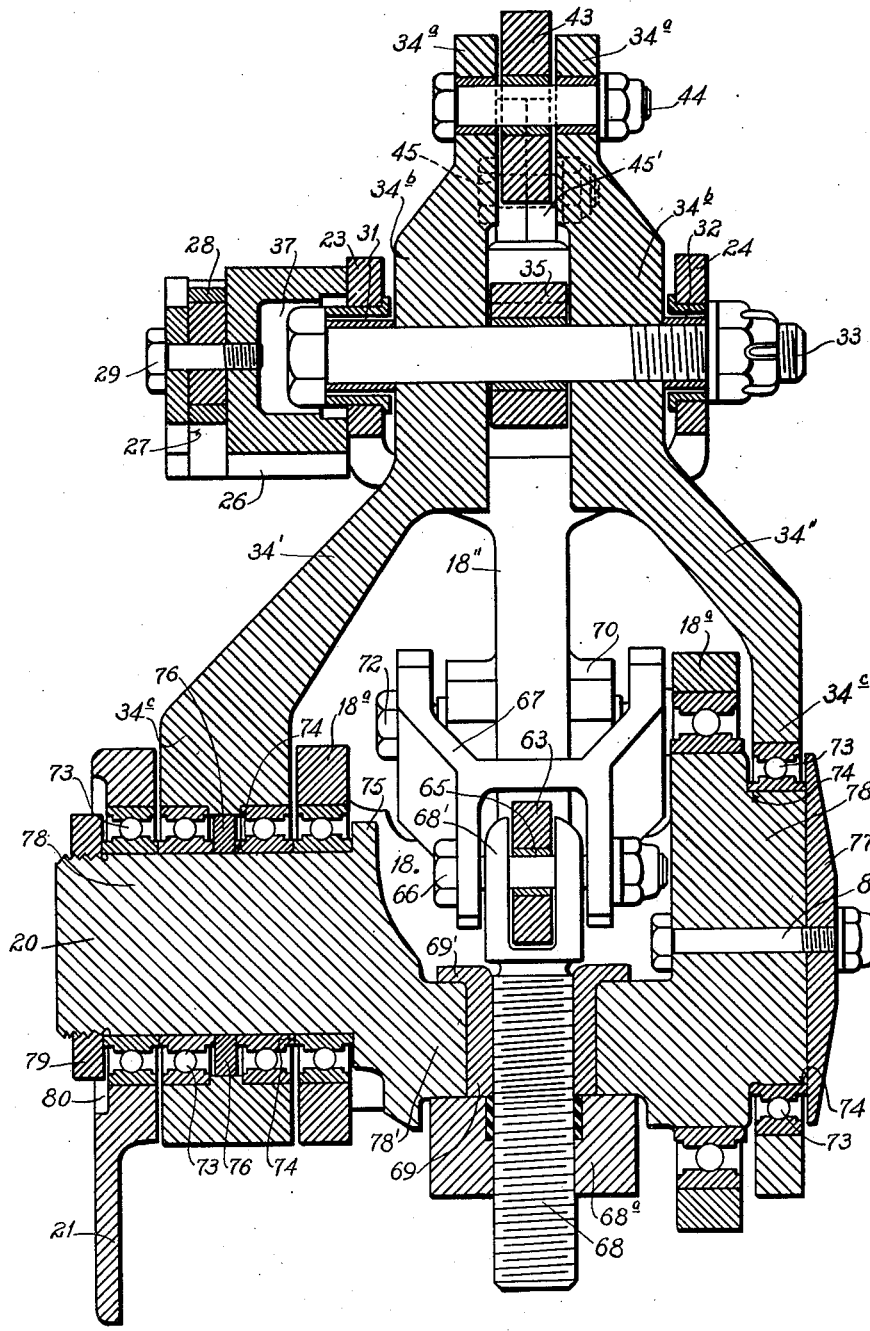
Fig. 5 is an enlarged sectional view taken along line 5—5 of Fig. 2.

Fig. 7 is a schematic view showing the linkage in conjunction with the hydraulic jack and illustrates the adjustment of the mechanical advantage; and Fig. 8 is a schematic perspective of the part of the linkage to illustrate the cooperation between the valve control rod of the bellcrank lever as well as between the cylinder rod of the hydraulic jack and the push pull rod for controlling the displacement of the movable control surfaces.

Since the development of aircraft capable of increasingly higher speeds, various control systems and mechanisms have been proposed or employed with the object of affording the pilot supplementary or auxiliary boosting power on the control element or lever in addition to that exerted by the pilot, whereby the resistance of the movable airfoils or control surfaces to adjustment at the increased speeds, or for any other reason, may be overcome solely by the usual or conventional control lever or stick, or by the latter in conjunction with some type of mechanical boost. However, the maximum speeds previously attainable, while high, did not approach or border on sonic speeds as is currently contemplated. Consequently, in these prior control systems the supplementary or auxiliary boosting means were primarily designed for use only in emergencies, as for example, in the recovery from a power dive, when the angular adjustment required for the movable control surfaces or air foils was relatively small and once the movement thereof had been initiated by using the available supplemental or auxiliary power as aforesaid, the pilot unassisted could continue the manipulation of the control lever or stick and adjust the control surfaces in the conventional manner.

At the greater speeds presently attainable and at the still higher speeds anticipated in the future, a more stable and reliable source of power for constant use in the operation of the control surfaces is not only desirable but necessary. In short, as the speed of the aircraft approaches, equals or exceeds sonic speed it becomes increasingly necessary to provide and constantly employ greater power for the adjustment of one or more of the movable airfoils or control surfaces than can be normally exerted by the pilot with or without the prior auxiliary boosts or supplementary devices. To that end the present invention contemplates a power unit integrated and associated with the control system and interposed between the movable control surfaces and the control lever or stick for the purpose of transmitting in one direction a force sufficient to overcome any resistance by the movable airfoil or control surface to movement or adjustment and transmitting or reflecting in the opposite direction to the control lever or stick a reduction of this force delivered to the movable airfoil or control surface.

While increasing speeds are largely responsible for the provision of boosts, means for developing mechanical advantage, and power means for the operation of the movable control surfaces, it is not necessarily the sole factor which contributes to the difficulty of adjusting these surfaces. The design and contour of the airplane and the distance of the movable control surfaces from the center of gravity thereof contribute to the problem of setting or adjusting the control surfaces. Thus it may be taken that the greater the distance the control surfaces are from the center of gravity the easier they are in general to adjust and this generality applies in most instances regardless of speed.

More particularly, the present invention by reflecting the force, in reduced ratio, transmitted from the power means to the control surfaces, and/or from the latter, to the control lever or stick, gives or imparts a reaction to the pilot which simulates the effect of directly adjusting the control surfaces solely by and from the control lever and thereby maintains the sense or "feel" characteristic of the operation of the conventional manual control; whereas in fact the movable control surfaces are adjusted entirely by and from a power operating unit capable of exerting forces appreciably in excess of those possible by the pilot with conventional direct control, with or without a boost or auxiliary mechanical advantage.

The present invention may function in conjunction with the conventional control systems heretofore used for the adjustment of all types of movable control surfaces such as elevators, rudders, flaps, tabs and other movable airfoils or control surfaces, but for the purpose of illustration one adaptation thereof is shown (Fig. 1) and described in connection with a conventional stick or principal control lever merely for the adjustment of the ailerons of an aircraft.

In the accompanying drawings 10 designates a fragment of an airplane fuselage having a cockpit or cabin 11 and a fixed airfoil or wing 12. The usual or conventional control lever or stick 13, located within the cockpit 11, serves to manipulate or adjust the movable control surfaces, here shown as the ailerons 14 pivotally mounted on or in the wing 12, through a linkage system 15, upon the spanwise movement of the lever 13. This combination of control lever 13, ailerons 14 and interconnecting linkage system 15 is environmental and illustrative, and hence may be said to represent any conventional or standard control system which per se forms no part of this invention and may be changed or varied at will without materially affecting this invention or its cooperation with this or any other adaptable system.

The present power unit and its associated components designated generally as 16 in Fig. 1, is incorporated in the linkage system 15 so that the control lever 13 and the control surfaces or ailerons 14 mutually react through said power unit or assembly. At the same time said power unit or mechanism 16 is so interposed in the chain of direct motion or application of power between the lever 13 and the ailerons 14 that the force which would be normally transmitted through said linkage system 15 from the lever 13 to the ailerons or vice versa in the absence of the present invention, is interrupted or broken by interposing the power assembly 16 between the lever 13 and the linkage system 15 to set up an entirely new force or source of power acting on both the control lever and the ailerons, the force applied or reflected back to the lever or stick being in a fixed or predetermined reduced ratio to that applied to the control surfaces or ailerons. While the power unit 16 is shown and described as being situated between the control lever 13 and the linkage system 15, it is to be understood that it may be interposed anywhere in the system between the aileron 14 or other movable control surface and the control lever 13; or that it may be duplicated at each movable surface in which event the several individual power units may be properly coordinated by any suitable means. Thus any movement of the ailerons or of the stick 13 is transmitted to the power unit assembly 16 where it initiates the operation thereof to develop an entirely new force which in turn is transmitted to both the ailerons 14 and, in reduced ratio, to the stick 13.

Moreover any original movement of the ailerons 14 is transmitted to the power unit 16 and, if unrestrained by pilot control, will not only react on or be reflected to the lever or stick 13 in reduced ratio, but may initiate the operation of said power unit. In short, the normal operation of the power unit 16 results in the transmission of the force developed thereby in both directions through the linkage system 15, the full power produced being delivered to the ailerons 14 and a reduction thereof being delivered to the stick 13.

The transverse or spanwise operation of the control lever or stick 13 for the ultimate adjustment of the ailerons actuates a reciprocating rod 17, which is attached to the end of one arm 18' of a bellcrank lever 18 by a bolt or other means of pivotal connection 19. Therefore, any transverse or spanwise movement of the control lever or stick 13 is imparted to the bellcrank lever 18 by the reciprocation of the rod 17 under the control of the lever 13. The bellcrank lever 18 is mounted for oscillation on a shaft or pivot 20 which in turn is rotatably mounted on or supported by any convenient part of the aircraft structure through a bracket or plate 21 supported and attached to said structure by the bolts 22 or other suitable fastening means (Figs. 2, 3, 4 and 5).

The other arm 18" of the bellcrank 18 is bifurcated or forked laterally at its extremity to create two spaced, parallel ears 23 and 24 (Fig. 5). A hollow block 26 is immovably mounted to rest flush against the outer surface of the ear 23 where it is attached by the bolts 25 piercing the ear and a relatively thin flange 26' projecting from one face of the block. The body of the block 26 surrounds and defines a relatively large cavity 37 opening toward the ear 23 and is closed by the latter when the block is in its operative position. Adjacent its outer surface the block 26 is slotted or channeled, as at 27, parallel to the outer surface of the ear 23 and extending inwardly and partially through the block from that face of the block 26 remote from the flange 26' toward the opposed face thereof. As will be described this block 26 provides a connection between the arm 18" of the bellcrank 18 and the valve 41 which controls the operation of the power unit 16, presently comprising a hydraulic jack, and the cavity 37 of the block 26 makes possible a lost motion connection between the arm 18″ of the bellcrank 18 and this power unit, whereby the bellcrank has a relatively small initial movement for the regulation of said valve in advance of any possible operation of the power unit and to avoid opposition by the power unit to this initial and necessary movement of the bellcrank 18.

The ears 23 and 24, respectively, are provided with the aligned oversize holes 31 and 32 for the reception of a bolt 33 traversing or passing through both ears. These holes are of equal size and are appreciably larger in diameter than the diameter of the bolt 33. Manifestly, while these holes 31 and 32 are illustrated as being circular, they may be elongated or even rectangular, provided they are precisely made and have a definite and accurate oversize relationship to the bolt 33 mounted therein. The bolt 33 connects the ears 23 and 24 of the arm 18″ of the bellcrank 18 to a composite lever 34 and the relationship of the size of the holes 31 and 32 to the diameter of said bolt provides for a definite and accurate degree of lost motion in the connection between the bellcrank lever 18 and the composite lever 34. This bolt 33 also has a close or tight fit with the composite lever 34 so that it becomes, in effect, an integral part of said lever while having the aforesaid lost motion connection with the bellcrank 18. In effect the end portions of the bolt 33 situated in the holes 31 and 32 respectively of the ears 23 and 24 have a roaming cooperation with these ears to the end that the bolt never has any active or direct connection with said ears. Thus the bellcrank lever 18 may be initially moved or adjusted by and from the principal control lever 13 to operate the valve 41 regulating the operation of the power unit 42 without any engaging contact with the composite lever 34 or being affected by any movement on the part of the latter. Since the composite lever 34 in practice is never connected to the ballcrank 18 and is positively connected directly with the control surfaces or ailerons 14, the latter are normally incapable of adjustment directly by or from the lever or stick 13, as will be hereinafter described.

The composite lever 34 is made up of two companion components or sublevers 34′ and 34″ secured one to the other for swinging motion in unison on and relative to the shaft or pivot 20. In Fig. 5 it will be observed that at their outer ends 34a—34b viz. the ends thereof remote from the shaft or pivot 20, these sublevers are parallel and somewhat spaced one from the other, while at their inner or pivoted ends they are each provided with a bearing 34c that embraces or encircles the shaft or pivot 20. While these bearings 34c of the sublevers 34′ and 34″ are also parallel one to the other they are relatively widely separated and in combination define a comparatively large space within the composite lever. It will also be noted that at its outer end, each sublever has an extreme outer section 34a and an inner section 34b. When these sections of the sublevers or components 34′ and 34″ are correspondingly aligned transversely of the composite lever 34, the space between the sections 34a is of less width than that of the space between the sections 34b. Between the bearings 34c and the sections 34b the sublevers converge inwardly from said bearings toward the inner ends of the sections 34b and mutually define the relatively large space within the composite lever which is to accommodate, house and permit the passage of other elements of the combination, as will be later evident.

With the bearings 34c engaging the shaft or pivot 20 the sections 34a or outer end portions of the sublevers 34′ and 34″ are disposed upon opposite sides of the extremity of the push-pull rod 43 to which they are pivotally secured by the bolt 44. To independently secure the outer end sections 34a of the sublevers 34′ and 34″ one to the other, and additionally to establish and limit the spaces on each side of the pull-push rod 43 where it joins the composite lever 34, each section 34a is provided with a lug 45′ bent laterally to rest flush against the opposed lug 45′ after the lever 34 and rod 43 are assembled. A bolt or other fastening means 45 pierces and secures the lugs 45′ in flush abutment as aforesaid.

The bolt 33 traverses and passes snugly through the sections 34b of the composite lever 34, as well as the holes or apertures 31 and 32 of the ears 23 and 24 of the arm 18″ of the bellcrank 18. Thus the bolt 33 for all intents and purposes becomes unitary with the composite lever 34, with its head 36 received in the cavity 37 of the block 26 where it has a slight movement independently of said block and of the bellcrank arm 18″.

From the foregoing, it will be seen that the decoupling of the composite lever 34 with respect to the bellcrank lever 18 resulting from the lost motion between the bolt 33, and the ears 23 and 24 of the arm 18″ of said bellcrank lever, permits a very limited initial movement of the latter independently of, and in advance of any movement by the composite lever 34, which through its direct connection with the push-pull rod 43 is ultimately moved by the power unit 16 to adjust the ailerons 14. In other words the forces acting on the control surfaces or ailerons 14 are transmitted through the push-pull rod 43 to the composite lever 34 but have no direct effect on either the bellcrank 18 or the control lever or stick 13. Conversely, no movement of the control lever or stick 13 normally has any direct effect on the push-pull rod 43 and the ailerons 14. However, with the power unit 16 and its control mechanism interposed in the control system as disclosed herein, movement at either end of the system, i. e., by the control surfaces or ailerons 14, or by the control lever or stick 13, is arrested at the power unit and is there translated into a totally new force initiated by the power unit, and this resulting new force is transmitted in both directions through the control system. In view of this, it may be said that the present aileron control system as presently illustrated and described comprises in effect two sections of linkage, viz., a forward section or that section which becomes activated whenever there is a transverse or spanwise movement of the control lever or stick, to wit: lever 13, reciprocating rod 17 and bellcrank 18, and a rearward section or that section which is activated whenever there is movement of the control surfaces or ailerons by the power unit 16 or by loads applied aerodynamically to these surfaces, to wit: linkage system 15, including push-pull rod 43 and composite lever 34.

The hydraulic jack or power source 42 and its control valve or mechanism 41 in the present adaptation is interposed between the aforesaid sections of the general control system with the jack 42 directly attached to the composite lever 34, and with the control mechanism or valve 41 directly connected to the bellcrank 18 and through it to the control lever 13.

The valve 41 which controls the operation of the power source or hydraulic jack 42 can be of any suitable and adaptable type or construction. It per se forms no part of the present invention and will only be very generally and schematically shown and described herein in order that its purposes and functions in the present combination can be fully understood. A control valve especially designed to function in conjunction with the instant system is shown, described and claimed in the co-pending application of Manuel Unterman, Serial No. 46,897, and by reference thereto the details of construction and operation of a suitable control valve can be understood. It is to be understood however that it is not proposed to limit this invention to any particular control valve or mechanism.

For its operation the valve 41 is provided with a reciprocable actuating valve rod 28 which is pivoted to the block 26 in the groove or slot 27, cut adjacent and parallel to the outer face of the block and is there held by the bolt 29 threaded into the block and piercing the extremity of the actuating rod 28 housed in said slot. Manifestly as the bellcrank 18 is oscillated on the shaft or pivot 20 by the control lever or stick 13 as aforesaid, the actuating rod 28 connected to the arm 18″ thereof by the block 26 will be immediately and correspondingly reciprocated to adjust the valve 41 for the operation of the power unit or hydraulic jack 42 in either direction dependent upon the direction of movement of the lever 13 out of neutral.

The control valve 41 for the power unit 42 is designed to receive hydraulic fluid from a standard reservoir (not shown) through an inlet fitting 46 and direct it to either end of the hydraulic power unit 42, according to the direction of movement of said rod 28 by and from the control lever 13 through the bellcrank 18.

The valve 41 has two outlet fittings and tubes respectively denoted 47 and 48 resepctively leading to opposite ends of the cylinder of the jack 42 and a single return fitting and tube 57 leading to the reservoir or supply of hydraulic fluid under pressure. Regardless of its internal construction the adjustment of the valve 41 by the actuating rod 28 moving in one direction directs the fluid from the inlet fitting 46 to and through the outlet fitting 47 and its adjustment in the other direction disconnects the inlet 46 and the outlet 47 and establishes communication between the other outlet 48 and the inlet 46. Whenever one of the outlets 47 or 48 is in communication through the valve with the inlet 46, the other or remaining outlet is connected by and through the valve to the return 57. In its neutral position the valve 41 is adjusted to disconnect the inlet 46 from communication with both outlets 47 and 48.

The power unit 42 is here illustrated as a two-way hydraulic jack or motor and its operation in either direction is directly controlled by the valve 41 and indirectly through the valve 41 by the oscillation of the bellcrank 18. It embodies the cylinder 42 having a piston (not shown) mounted for reciprocation therein and dividing the cylinder into two chambers one on each side of the piston. One of these chambers connects with the outlet 47 of the valve 41 through a pipe or tube 49, and the other chamber connects with the remaining outlet 48 of the valve 41 through a similar pipe or tube 50. Hence when fluid under pressure is directed by the valve 41 to one of the chambers of the cylinder 42, the piston therein will be forced in one direction and the companion chamber will be emptied. When fluid under pressure is admitted into the other chamber, the movement of the piston will be reversed, and the first chamber in its turn will be emptied. As either of the chambers of the cylinder 42 is emptied, the fluid being discharged therefrom, is conducted by one or the other of the tubes 49 or 50 to the valve 41 to be directed thereby to the return fitting and tube 57. Thus each of these chambers of the jack 42 when being emptied, is connected by the valve 41 to the return fitting and tube 57 while simultaneously the other chamber is connected by the valve 41 to the inlet 46.

It is to be understood that the hydraulic motor or jack 42 and the valve 41 are merely examples of a power unit and that neither of them per se forms any part of the present invention. Any other type of motor or valve or their equivalents may be used and connected in the system to function exactly as do the valve 41 and motor or jack 42.

It is obvious from the foregoing that the movement or oscillation of the stick or lever 13 causes a corresponding movement of the reciprocating rod 17 which in turn swings the bellcrank 18 on the pivot or shaft 20 in either direction. This movement of the bellcrank 18 initially adjusts the valve 41 whereupon the hydraulic jack or motor 42 will operate in the appropriate direction. The operation of the hydraulic jack or motor 42 projects or retracts the piston rod 58 thereof. From the drawings it will be apparent that the head at one end of the cylinder 42 has a rod 35 rigidly and immovably secured thereto, which rod extends to and terminates in the space between the sections 34b of the composite lever 34 where it is pivotally secured to that portion of the bolt 33 traversing the space between said sections 34b. There is no play or lost motion in the connection between the cylinder rod 35 and the bolt 33, or between the bolt 33 and the composite lever 34, but there is a lost motion connection, as above set forth, between the ears 23 and 24 of the bellcrank arm 18″ and the bolt 33. Thus as the bellcrank 18 is oscillated by the lever 13, it will adjust the valve 41 by means of the connection between the block 26 and the valve actuating rod 28 in advance of any effective operation of the jack 42.

In opposition to the cylinder rod 35 the rod 58 is fixed to the piston operating within the hydraulic jack or motor 42 and projects concentrically through the cylinder head remote from the cylinder rod 35. This piston rod 58 at its outer end is pivotally connected, as at 60, adjacent one end of a supporting lever 59. The opposite end of the supporting lever 59 is mounted to swing on a fixed and stationary pivot 59′. This lever 59 is forked or bifurcated through most of its length and particularly at its upper end to create the spaced parallel arms 61 and 62 which, at their ends, are mounted to swing on the stationary pivot 59′ and to permit the passage of the push-pull rod 43 between them. It will be noted that the pivotal connection 60 between the piston rod 58 and the lever 59 is somewhat removed from the lower extremity of that lever. As the piston reciprocates within the cylinder 42 its movement in one direction reduces the distance between the extremities of the cylinder rod 35 and the piston rod 58, while its movement in the opposite direction extends or increases this distance. In this manner and for this reason the jack 42 as an assembly may be said to contract or to extend or elongate in accordance with the adjustment of the valve 41. Since the extremities of the cylinder rod 35 and the piston rod 58 are respectively connected to the composite lever 34 and the supporting lever 59 as above described, variations in the distance between the extremities of said rods 35 and 58 serve to rotate or oscillate the levers 34 and 59 about their respective pivots 20 and 59'. Thus the entire force exerted by the jack or power unit 42 is transmitted in opposite directions to the levers 34 and 59. Manifestly, since the composite lever 34 is a component or element of the rearward section of the linkage system 15, the force serving to move this lever is directly applied to the push-pull rod 43 and against the resistance to movement by the control surfaces or ailerons 14 thereby adjusting the latter.

The outer extremity of the lever 59, or that end of the lever most remote from its pivot at 59', terminates in a fork which receives and supports an end of a counteracting rod 63 pivoted therein by the bolt 64. This counteracting rod 63 is rigidly disposed between the shaft 20, as shall be more fully described, and the free end of the lever 59 and maintains said lever in a more or less fixed position, or very materially limits its swinging or pivotal movement on the pivot 59'. Among its other purposes this arrangement and construction is to restrict the oscillation of the lever 59 upon the operation of the power unit or jack 42. In other words and more specifically, in view of the variations in the distance between the bolt 33 and the pivot 60, due to the operation of the power unit or jack 42, the force transmitted from the jack 42 to the composite lever 34 is ultimately applied to the control surfaces or ailerons 14 while the force transmitted to the lever 59 tends to move the latter but this movement is restrained or limited by the rigid counteracting rod 63. Thus the counteracting rod 63 serves the double purpose of restricting and limiting the movement of the supporting lever 59 on its pivot 59' and of reacting to the restricted or limited movement thereof to reflect or impose the same on the bellcrank 18 and through it on the control lever or stick 13. Therefore, the operation of the power unit or jack 42 causes a reduction or extension of the distance between the extremities of the cylinder rod 35 and the piston rod 58 and this, in turn oscillates or rotates the composite lever 34 on the pivot or shaft 20 against the resistance to movement by the control surfaces or ailerons 14. Simultaneously, and as the rod 63 acts to limit the movement of the lever 59, the power or force developed by the operation of the jack or power unit 42 will be delivered by said rod 63 to the pivot or axis 20 and a reduction thereof will be imposed on the bellcrank 18 and through it to the rod 17 and lever or stick 13.

The pivot or shaft 20 is rotatably mounted in the fixed bracket or plate 21 secured to a convenient part of the aircraft structure and in turn pivotally supports the components 34' and 34'' of the composite lever 34 as well as the bellcrank 18. The elbow between the arms 18' and 18'' of the bellcrank 18 is provided with the transversely spaced bearings or mounting members 18a which embrace and rotate on the pivot or shaft 20, as do the bearings 34c of the composite lever 34. The pivot or shaft 20 is provided with the coaxial end portions or trunnions 78 on which are rotatably mounted the spaced bearings 18a of the bellcrank 18 and the spaced bearings 34c of the composite lever 34. Between these trunnions or end portions 78 the shaft or pivot 20 is eccentrically reduced to create a crank 78'. The elements which are mounted on the trunnions 78 of this shaft 20, viz., the bellcrank 18 and the composite lever 34, are provided with anti-friction bearings 73 to facilitate the rotation of these levers 34 and 18 thereon. In like manner similar anti-friction bearings are provided in and define the opening in the plate 21 through which one of the trunnions or end portions 78 of the pivot or shaft 20 passes to permit the rotation of the latter with respect to the plate 21. Thus the shaft or pivot 20 may freely rotate in the bracket plate 21 and the bellcrank 18 and composite lever 34 may independently rotate on the end portions or trunnions 78 on each side of the crank 78'. The inner raceway or track of each anti-friction bearing 73 which embraces or encircles the peripheries of the trunnions 78 is provided on its opposed sides with the projecting shoulders 74 which serve as spacers between the independently rotating bearings mounted on the trunnions when they are secured or clamped between the head 77 at the end of one trunnion and the nut 79 threaded on the extremity of the other trunnion, and which is tightened within a recess 80 in the mounting plate or bracket 21 to press upon and firmly abut the surface of the plate 21 in opposition to the head 77. The bearing 34c of the component or sublever 34' of the composite lever 34 being considerably thicker than its companion bearing 34c of the sublever 34'' is provided with the double bearings 73 intermediately spaced by a washer 76. The trunnions 78 are so formed that projecting annular abutments or shoulders 75 are created thereon to prevent any sliding or axial movement of the elements or bearings mounted thereon.

As above described the shaft or pivot 20 is provided with the medial crank 78' and the end of the trunnion 78 adjacent the head 77 is substantially flat or parallel with the head to permit a bolt 81 to axially pierce that trunnion and the head 77 to affix the latter to the trunnion of the shaft or pivot 20.

The crank 78' of the shaft 20 is provided with a central transverse hole in which an internally threaded bushing 69 is seated snugly and is additionally positioned therein by the flange 69' formed on the inner end thereof to bear on the crank. A connecting bolt 68 is threaded into the bushing 69 from the inner side of the crank 78' to project beyond the opposite face of the crank where it is engaged by a lock nut 68a. The inner end of this bolt 68 terminates in a clevis 68' the arms of which project beyond the inner surface or periphery of the crank 78' where they engage between them that end of the rod 63 most remote from the lever 59. Both the end of the rod 63 and the clevis 68' of the bolt 68 are provided with aligned openings containing bushings 65 for the passage therethrough of a bolt 66 which provides a pivotal connection between the rod 63 and the clevis 68'. The pivotal connection thus established between the rod 63 and the crank 78' is located in the space provided between the trunnions 78 of the shaft 20 and also between the spaced bearings 18a of the bellcrank 18, but as will be observed particularly in Figs. 5 and 6, the center or axis of this connection is eccentric relative to common axis of the trunnions 78 of the shaft 20.

Since the bolt 68 can be said to constitute an integral but adjustable part of the shaft or pivot 20 on which both the bellcrank 18 and the composite lever 34 are mounted for oscillation, this connection of the rod 63 to the bolt 68 by the pivot 66 serves to transmit the movement of the rod 63 resulting from the operation of the power unit or jack 42 to the crank 78' thereby producing a torque or tendency to rotate in the bracket plate 21 on the part of the shaft or pivot 20 due to the eccentricity of the crank 78'. Obviously, the rotation of this shaft 20 will be limited by contact of the rigid rod 63 with the crank 78' of the shaft as the crank 78' is oscillated with the trunnions 78. Moreover, this rotation of the shaft 20 has no effect on its associated elements, viz., the bellcrank 18 and the composite lever 34 because these elements are free to rotate on the trunnions 78 and therefore said trunnions are free to rotate relative to the lever 34 and bellcrank 18 and all are mounted concentrically to the axis of the shaft 20. Nevertheless, as the force transmitted through the counteracting rod 63 from the power unit 42 is applied eccentrically to the axis of the shaft 20 it will tend to rotate this shaft 20 and the force so applied is substantially identical with the force applied by the piston rod 58 on the supporting lever 59. It is the purpose of the instant invention to transmit the force so applied to the crank 78' of the pivot 20 to the control lever or stick 13 in a reduced ratio.

An intermediate link 67 is interposed between the counteracting or reacting rod 63 and the bellcrank lever 18 and for that purpose one of its ends is rotatably mounted on the bolt 66 and becomes in effect, a pivoted extension of the rod 63. This link 67 serves to connect the bolt 66 with the arm 18" of the bellcrank 18. Both ends of the link 67 are bifurcated or forked so as to straddle the arm 18" of the bellcrank lever 18 at one end and the clevis 68' of the bolt 68 which engages the extremity of the connecting rod 63 at its other end. Lugs or shoulders 70 are formed on the bellcrank arm 18" adjacent the connection of the link 67 with this bellcrank arm and a bolt 72 passes through the link 67 and the bellcrank arm 18" at the lugs 70 to pivotally connect the link and bellcrank. It will be noted from Fig. 5 that the arms of the bellcrank lever 18, the link 67, the bolt 68 and its clevis 68' and the reacting rod 63 are all generally disposed in substantially the same vertical plane of operation.

It will also be observed that the reacting rod 63 and the intermediate link 67 each pivot or hinge on the bolt 66 by which they are interconnected and that the other end of the link 67 is pivoted to the arm 18" of the lever 18. The position of the bolt 66 and its axis relative to the crank 78' and axis of the trunnions 78 is determined by the bolt 68 and can be varied by the adjustment of said bolt 68 relative to the crank. If the bolt 68 is so adjusted that the axis of the bolt 66 coincides with, or constitutes a continuation of the axis of the trunnions 78 of the shaft 20, the operation of the power unit 42 will have no effect on the bellcrank 18 or on the control stick 13. As the distance between the axis of the bolt 66 and the common axis of the trunnions 78 increases the greater becomes the mechanical advantage and the less the reduction of the force developed by the power unit 42 as applied to the bellcrank 18 and the control lever or stick 13. By adjusting the pivotal connection 66 between the ends of reacting rod 63 and link 67 inwardly or outwardly of the axis of trunnions 78, the torque exerted by reacting rod 63 is increased or diminished.

Thus the mechanical advantage between the reaction rod 63 and the bellcrank lever 18 increases with the increase of the distance between the axis of the bolt 66 and the axis of the trunnions 78 but the reverse is true with respect to the control lever 13. In other words when the axis of the bolt 66 coincides with the axis of the trunnions 78 the control lever or stick 13 will have its greatest mechanical advantage and as the distance between said axes increases the mechanical advantage of the control lever or stick 13 decreases.

The adjustment of the bolt 68 relative to the crank 78' determines the relative positions of the axes of the bolt 66 and trunnions 78 and may be carried out by any desired means such as the coacting threads on the bolt 68 and the bushing 69. It will be seen that with the structure shown the relative positions of these axes is determined by the position of the bolt 68 relative to the crank 78' and that once determined it is set by the lock nut 68a. In short the present disclosure confines this adjustment to the ground. By the foregoing mechanism a predetermined reduction of the power or force transmitted through the rod 63 from the power unit 42 is applied by the rotation of the shaft or pivot 20, due to the eccentricity of the connection between the rod 63 and the crank 78' of the shaft 20 to the bellcrank lever 18 and through it to the stick 13. It is the predetermined position of the bolt 68 and of the link 67 relative to the crank 78' that determines the relative positions of the axes of the bolt 66 and shaft 20 and which also determines how much the force being transmitted through the rod 63 will be reduced for application to the bellcrank 18. Obviously the reduced force to be applied to the bellcrank 18 should always be less than that which a pilot is generally capable of exerting on the control lever or stick 13. Because of the direct connection between said bellcrank 18 and said stick 13 as previously described, and the direction of rotation of the bellcrank 18 due to this reduced force movement of the control lever or stick 13 will always be in opposition to the movement thereof required for the actuation or continued operation of the valve 41.

From the foregoing it becomes manifest that the reduced force from the operation of the power unit 42 applied through the rod 63 on the bellcrank 18 causes the latter to rotate or oscillate in direct opposition to the movement of the composite lever 34 resulting from the same operation of the power unit 42. Since the bellcrank 18 is a component of what has already been described as the forward linkage section and is directly connected to the pilot's control lever or stick 13, this rotation or oscillation of the bellcrank will tend to move the control lever or stick, and it is this force tending to move the stick 13 which the pilot will feel and must overcome in order to actuate the valve 41, and continue the sustained operation thereof, once its actuation has been initiated.

As hereinbefore described the bellcrank 18 is capable of independent, initial movement on the shaft 20 prior to any movement of the composite lever 34 due to the oversize holes 31 and 32 respectively in the ears 23 and 24 of its arms 18''', and that this initial, independent movement serves to actuate the valve 41 directly connected to said bellcrank arm 18". The minimum size of these oversize holes 31 and 32 is such that the end portions of the bolt 33 therein are free to move or roam in the openings without at any time contacting their edges and thus the individual or independent movements of the lever 34 and the bellcrank lever 18 on the shaft 20 is maintained. Moreover, since these levers 34 and 18 are always independently moving or rotating about their common axis 20 in opposite directions, the pilot only feels, or is aware of the rotation or oscilllation of the bellcrank 18, and therefore only has to overcome the force causing this rotation or oscilation in order to maintain the continued operation of the valve 41. In other words, when the ends of the bolt 33 move from the center of the holes 31 and 32, which corresponds to the neutral position of the control lever or stick 13, toward the edges of the holes, the valve 41 is actuated, and then the hydraulic jack or power unit 42 is immediately activated. The power unit 42, in moving or rotating the composite lever 34 and ultimately adjusting the control surfaces 14, moves the bolt 33 in the opposite direction within the holes 31 and 32 or back toward the center of these holes. At the same time, the tendency to reverse movement of the bellcrank 18 resulting from the force relayed or transmitted to it through the rod 63 and the intermediate link 67 upon the operation of the power unit 42 is, in effect, also moving the bolt 33 toward the center of these holes. Therefore, connection between the bellcrank 18 and composite lever 34 through the bolt 33 will never occur during the operation of the power unit 42, for when the bolt 33 becomes substantially concentric within the holes 31 and 32, the valve 41 is actuated to neutral thereby arresting the operation of power unit 42 and further movement of the bolt relative to the slots 31 and 32 in that same direction results in the opposite operation of the valve 41 and the hydraulic cylinder or power unit 42.

On the other hand should the pilot wish to continue the operation of the power unit 42 and thereby increase the angular displacement of the ailerons 14, he has only to continue to overcome the resistance to movement by the bellcrank 18 in order to maintain the continued eccentricity of the bolt 33 relative to the oversize holes 31 and 32 by moving the bellcrank lever 18 and consequently the oversize holes therein in the same direction in which the bolt is being moved by the power unit 42. As long as he shall continue to overcome the resistance to movement of the control lever or stick 13 to keep pace with the operation of the jack or power unit 42, the valve 41 and the power unit 42 continue to operate, and the power exerted by the unit 42 will be overcoming increasing resistance to movement of the ailerons 14, as the angle of deflection thereof increases. Consequently, the pilot will experience increasing difficulty in moving the control lever or stick 13 as the resulting angle of deflection of the ailerons increases, since the force exerted by the power unit 42 in overcoming the resistance of the ailerons to movement is transmitted through the counteracting rod 63 to the bellcrank 18 and therefore to the control lever or stick.

However, once the desired angle of deflection of the ailerons 14 has been attained the pilot ceases to overcome the resistance in the control lever or stick 13, or ceases to keep pace with the operation of the power unit 42, so that the continued operation of the power unit moves the bolt 33 to become concentric with the holes 31 and 32 of the bellcrank arm 18'' whereupon the valve 41 is actuated to neutral and halts the operation of the power unit. The operation just described is purely theoretical because the valve under these circumstances would not completely close or rest exactly in neutral. It would in fact remain sufficiently open for the power unit to develop just enough power to overcome the aerodynamic loads on the deflected control surface which always tend to return it to nuetral. Until further movement of the control lever or stick 13 by the pilot, the power unit 42 remains inactive and becomes, in effect, a fixed length member disposed between the more or less fixed lever 59 and the composite lever 34 to which the push-pull rod 43 in connected. The positions of angular deflection of the ailerons 14 are therefore maintained and the aerodynamic forces acting against them would be transmitted through the push-pull rod 43 to the composite lever 34. The rotation or oscillation of the lever 34 on the shaft 20 tends to cause rotation or oscillation of the lever 59 about its fixed pivot 59', since these levers are interconnected by the power unit now fuctioning as a fixed length member 42 between levers 34 and 59. Such rotation, or rather the tendency to rotate, by the lever 59 places the counteracting rod 63 under tension or compression similar to that resulting from the operation of the power unit 42 as above described. Likewise, this tension or compression is transmitted to the bolt 66 and through the intermediate link 67 to the bellcrank 18 where it is applied by the direct connections to the main control lever or stick 13.

The operation of the power mechanism may be summarized as follows: When the pilot moves the control stick 13 in a direction such as to impart a thrust in an outward or right-hand direction (Fig. 1) to reciprocating rod 17 this rod, through its connection with bellcrank lever 18, will rock the bellcrank lever anti-clockwise upon its pivot 20. This moves actuating rod 28 to the left to shift control valve 41 and operate the jack 42. As already described, the arrangement of the valve and cylinder is such that the cylinder moves in the same direction as the valve member. Therefore, when valve rod 28 moves to the left (Fig. 2) the jack cylinder 41 and rod 35 also moves to the left to urge composite lever 34 anti-clockwise, thus causing composite lever 34 to follow bellcrank lever 18 and tending to shift the bolt 33 within the openings 31 of the bellcrank. Anti-clockwise movement of composite lever 34 causes push-pull rod 43 to move to the left.

To cause the cylinder of jack 42 to move to the left, fluid is admitted to the left end of the cylinder and the fluid exerts a force on the piston in the cylinder tending to move the piston and piston rod 58 to the right. Therefore, lever 59 swings anti-clockwise about its fixed pivot 59' and counteracting rod 63 is moved to the right (Fig. 2). This movement applies, or tends to apply, a force, through pivot 66 and intermediate link 67, to bellcrank lever 18 tending to rock it clockwise, which clockwise movement transmits a force of "feel" to the hand of the pilot through the bellcrank 18, reciprocating rod 17 and stick 13.

When the stick 13 is moved so as to project reciprocating rod 17 in a left-hand direction, the parts move in the reverse order from that described above.

In the illustrated form of this invention the casing of the control valve 41 is fixedly mounted on the cylinder of the hydraulic jack or motor and therefore moves with this cylinder whenever it moves. The adjustment of the valve rod 28 by the stick 13 operating through the bellcrank lever 18 immediately initiates the operation of the power unit 42, which operation entails a bodily movement of its cylinder together with the attached valve casing. If, when this occurs, the pilot holds the stick 13 and valve rod 28 stationary and does not impart to the valve rod a movement coordinated with the movement of the cylinder, the valve casing will move relative to the rod 28 and the valve or valves attached thereto until the valve or valves reach the neutral position thereof whereupon the operation of the power unit is arrested since at that point, the outlets 47 and 48 are both closed.

As above pointed out the oversize openings 31 and 32 permit the movement of the bellcrank 18 by the stick or control lever 13 independently of the lever 34 so that the valve 41 may be actuated prior to any movement of the lever 34. Additionally, however, these oversize openings 31 and 32 insure the reaction of the rod 63 on the bellcrank lever 18 because, in effect, the levers 34 and 18 are always uncoupled since the loads applied to the lever 18 are always in a direction which permits it to move relative to the lever 34.

Of course, the components directly associated with the power unit 42 together with the various pivots thereof form a definite geometrical pattern which determines the ultimate effect of the operation of the power unit 42. Any number of arrangements or combinations of this articulated pattern are possible and depend upon flight conditions or factors and the force which the individual pilot is capable of applying on the control lever or stick 13. Such modifications are merely dimensional or changes in degree and can be best determined or established in the light of the performance of a particular aircraft under the particular or anticipated flight conditions.

The adjustment of the bolt 68 in either direction allows for ample variation in the ratio between movement of the control lever or stick 13 and the resulting movement of the ailerons 14 and vice versa. Even after installation of the unit in the control system, the position, or more particularly the effective length of this bolt 68 extending inwardly of the crank 78' of the pivot or shaft 20, can be readily adhered to in order to obtain required power for adjustment of the control surfaces and the appropriate reaction thereof on the control stick.

Also, it is important to note that the present assembly is designed for aircraft where space and weight limitations are ever severe, and for that reason the most compact adaptation has been herein described and illustrated but it is to be understood that this compact arrangement may be altered, varied or developed without departure from the spirit and scope of the invention.

What is claimed is:

1. The combination with a push-pull rod for the adjustment of a movable control surface of an aircraft and a pilot's control lever, of a power unit interposed between the control lever and the push-pull rod, a power unit control for governing the operation of said unit, a primary lever mounted for oscillation about a fixed pivot at one of its ends and connected to both the power unit and the push-pull rod at the other of its ends, a bellcrank lever mounted on the same pivot as the primary lever and connected to both the pilot's control lever and the power unit control whereby the adjustment of the pilot's control lever adjusts said bellcrank lever about its pivot and thereby actuates the power unit control, a secondary lever mounted for oscillation on a fixed pivot at one of its ends and connected to the power unit adjacent its opposite end in opposition to said primary lever, a reacting rod pivoted to the extremity of the secondary lever and extending approximately to the pivot of the bellcrank lever, a link pivotally connected at its ends to the bellcrank lever and to the reacting rod, and means whereby the distance between the axis of the pivotal connection of said link to the reacting rod and the axis of the pivot of the bellcrank lever may be established and adjusted.

2. The combination with a hydraulic jack comprising a cylinder, a piston reciprocable within said cylinder, a piston rod attached to said piston and projecting through one end of the cylinder, and a cylinder rod affixed to and projecting from the opposite end of the cylinder, of a valve carried by the cylinder adjustable to control the reciprocation of the piston therein, a rotary shaft having an eccentric crank mounted for rotation adjacent one end of the cylinder, an operating lever mounted for oscillation upon said shaft and connected to one of the aforesaid rods of the hydraulic jack, a control lever mounted upon said shaft and having movement thereon independently of the operating lever, a connection between said control lever and the valve whereby the oscillation of the control lever on the shaft actuates the valve and thereby regulates and controls the operation of the hydraulic jack, an operating rod connected to the operating lever, a reaction lever pivotally mounted for oscillation about a fixed pivot at the opposite end of the hydraulic jack to the operating lever and connected to the other of the rods of the hydraulic jack, a reaction rod pivoted at one of its ends to the extremity of the reaction lever and having its opposite end situated adjoining the crank of the shaft aforesaid, a link pivoted to said control lever at one end and having its other end adjoining the aforesaid crank and the end of the reaction rod, a common pivot member connecting the adjacent ends of the link and reaction rod, the distance of the axis of the common pivotal connection between the reaction rod and between the link and the reaction rod with respect to the axis of the aforesaid shaft determining the magnitude of the mechanical advantage between the reaction rod and the link aforesaid.

3. The combination defined in claim 1 wherein the last mentioned means includes a bolt pivotally connected to the pivotal connection of said link to said reacting rod and traversing the fixed pivot of the bellcrank lever, and means for adjusting said bolt to thereby establish and adjust the distance between the axis of the pivotal connection of said link to said reacting rod and the axis of the pivot of the bellcrank lever.

4. The combination with a push-pull rod for the adjustment of a movable control surface of an aircraft and a pilot's control lever, of a power unit interposed between the control lever and the push-pull rod, a power unit control for governing the operation of said unit, a primary lever mounted for oscillation about a fixed pivot at one of its ends and connected to both the power unit and the push-pull rod at the other of its ends, said fixed pivot including a rotary shaft having an eccentric crank thereon for rotation therewith, a bellcrank lever mounted on the same pivot as the primary lever and connected to both the pilot's control lever and the power unit control whereby the adjustment of the pilot's control lever adjusts said bellcrank lever about its pivot and thereby actuates the power unit control, a secondary lever mounted for oscillation on a fixed pivot at one of its ends and connected to the power unit adjacent its opposite end in opposition to said primary lever, a reacting rod pivoted at one of its ends to the extremity of the secondary lever and extending approximately to the pivot of the bellcrank lever, a link pivotally connected at its ends to the bellcrank lever and to the other end of the reacting rod, and means for adjusting and establishing the distance between the axis of the pivotal connection of the link and reacting rod to the axis of the pivot of the bellcrank lever comprising a bolt having a clevis at one end pivotally engaged with the pivotal connection between the link and the reacting rod and a threaded shank traversing and operatively engaging the crank of said shaft, and a nut operative on the threaded shank of said bolt in opposition to the clevis to lock said bolt in position relative to said crank.

References Cited in the file of this patent

UNITED STATES PATENTS

| Number | Name | Date |
|---|---|---|
| 1,978,738 | Bragg | Oct. 30, 1934 |
| 2,215,423 | Heftler | Sept. 17, 1940 |
| 2,222,886 | Voigt | Nov. 26, 1940 |
| 2,282,053 | Hey | May 5, 1942 |
| 2,284,298 | Newton | May 26, 1942 |
| 2,360,542 | Berry | Oct. 17, 1944 |
| 2,366,382 | Burton | Jan. 21, 1945 |
| 2,395,671 | Kleinhans | Feb. 26, 1946 |
| 2,437,536 | Johnson | Mar. 9, 1948 |
| 2,462,994 | Price | Mar. 1, 1949 |
| 2,503,956 | Lisle | Apr. 11, 1950 |